United States Patent [19]

Oishi

[11] Patent Number: 4,761,875

[45] Date of Patent: Aug. 9, 1988

[54] METHOD OF MANUFACTURING PAD FOR MAGNETIC RECORDING TAPE CASSETTE

[75] Inventor: Kengo Oishi, Kanagawa, Japan

[73] Assignee: Fuji Photo Film Co., Ltd., Kanagawa, Japan

[21] Appl. No.: 39,270

[22] Filed: Apr. 17, 1987

[30] Foreign Application Priority Data

Apr. 17, 1986 [JP] Japan .................................. 61-88769

[51] Int. Cl.$^4$ ............................................. B21D 28/06
[52] U.S. Cl. ...................................... 29/527.4; 29/889
[58] Field of Search ...................... 29/827, 856, 527.4, 29/884; 264/149, 171, 172; 439/885

[56] References Cited

U.S. PATENT DOCUMENTS

| | | | |
|---|---|---|---|
| 3,423,516 | 1/1969 | Segerson | 29/856 X |
| 4,197,636 | 4/1980 | Osanai | 29/884 X |
| 4,445,736 | 5/1984 | Hopkins | 29/827 X |
| 4,628,597 | 12/1986 | Meehan et al. | 29/827 |
| 4,715,118 | 12/1987 | Bernard et al. | 29/856 |

OTHER PUBLICATIONS

Primary Examiner—Timothy V. Eley
Assistant Examiner—Carl J. Arbes
Attorney, Agent, or Firm—Sughrue, Mion, Zinn, Macpeak, and Seas

[57] ABSTRACT

A method of manufacturing a pad for pressing a magnetic recording tape of a magnetic recording tape cassette against a magnetic head comprises steps of intermittently feeding a metal strip to a plastic injection mold, successively molding pad bodies on the metal strip by injection molding of synthetic resin, cutting the metal strip at the middle points between the pad bodies, and forming mounting portions for mounting the pad on the casing on opposite ends of the metal strip of each pad body-metal strip assembly thus obtained.

5 Claims, 2 Drawing Sheets

FIG. 1
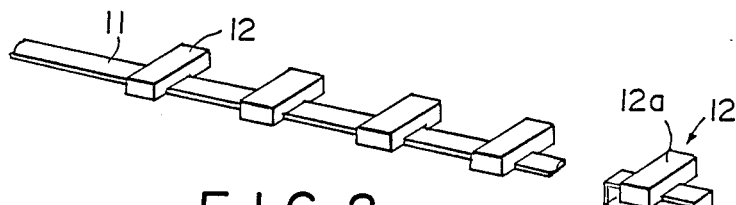
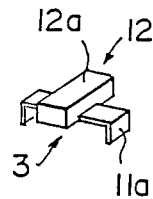
FIG. 2
PRIOR ART
FIG. 3
PRIOR ART
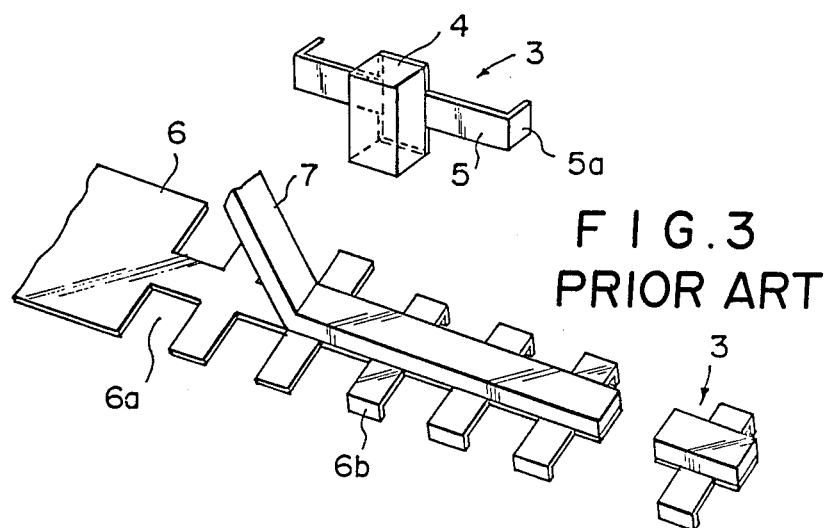
FIG. 4
PRIOR ART
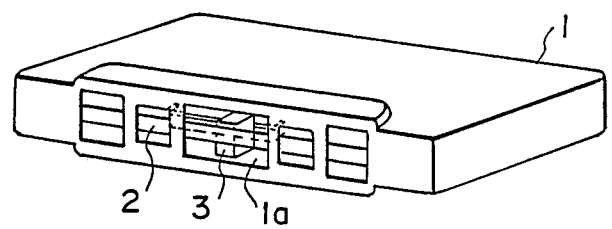

METHOD OF MANUFACTURING PAD FOR MAGNETIC RECORDING TAPE CASSETTE

BACKGROUND OF THE INVENTION

This invention relates to a method of manufacturing a pad for pressing a magnetic recording tape of a magnetic recording tape cassette against a magnetic head of a magnetic recording and reproducing system.

FIELD OF THE INVENTION

FIG. 4 shows the external appearance of a magnetic recording tape cassette. In the magnetic recording tape cassette, a magnetic recording tape 2 is wound around a pair of hubs (not shown) built in a casing 1, and is pressed against the magnetic head (not shown) of a recording and reproducing system by a pad 3 through an access opening 1a formed in one side of the casing 1. As shown in FIG. 2, the pad 3 comprises a substantially square pad body 4 fixed to a strip-like resilient member 5 made of metal. The resilient member 5 has end portions 5a bent substantially in perpendicular to the body portion and is mounted on the casing 1 at the end portions 5a.

When manufacturing the pad 3, conventionally a continuous felt material 7 is first bonded to a relatively wide metal strip 6 to extend in the longitudinal direction of the metal strip 6 as shown in FIG. 3, and then unnecessary portions 6a of the metal strip 6 on opposite sides of the felt material 7 are stamped out leaving rib-like portions 6b. Thereafter, the metal strip 6 is cut at the middle between the rib-like portions 6b, and each cut piece is bent at opposite ends to obtain a pad 3.

However, the conventional method of manufacturing the pad 3 is disadvantageous in that loss of metal material is high due to the unnecessary portions 6a stamped out from the metal strip 6 and the stamping step requires much time and labor. Further, since the pad body is of a felt material, the force for pressing the magnetic recording tape against the magnetic head is apt to be uneven and fibers falling off from the pad body can adhere to the magnetic recording tape to cause dropout.

SUMMARY OF THE INVENTION

In view of the foregoing observations and description, the primary object of the present invention is to provide an improved method of manufacturing a pad for a magnetic recording tape cassette in which the pad can be easily manufactured without loss of the material and which can manufacture a pad which can stably press the magnetic recording tape against the magnetic head.

In accordance with the present invention, a metal strip having a width equal to the width of the resilient member of a finished pad is intermittently fed to a plastic injection mold and pad bodies are successively molded on the metal strip by injection molding of synthetic resin. Thereafter, the metal strip is cut at the middle points between the pad bodies, and mounting portions for mounting the pad on the casing is formed on opposite ends of the metal strip of each pad body-metal strip assembly thus obtained.

In one embodiment of the present invention, the mounting portions are in the form of bent portions on opposite ends of the resilient member, and in another embodiment of the present invention, the mounting portions are in the form of cutaway portions formed on opposite ends of the resilient member.

BRIEF DESCRIPTION OF THE DRAWINGS

FIG. 1 is a perspective view for illustrating a method of manufacturing a pad of a magnetic recording tape cassette in accordance with an embodiment of the present invention, FIG. 2 is a perspective view showing a conventional pad, FIG. 3 is a perspective view for illustrating the method of manufacturing the conventional pad, FIG. 4 is a perspective view showing the external appearance of the magnetic recording tape cassette.

DESCRIPTION OF THE PREFERRED EMBODIMENTS

Figure 5:
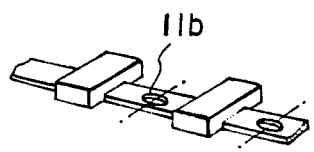
FIGS. 5 and 6 are perspective views for illustrating another embodiment of the present invention.

In FIG. 1, a phosphor bronze strip 11 having a width equal to the width of the resilient member of a finished pad is intermittently fed to a plastic injection mold (not shown), and pad bodies 12 are successively molded on the phosphor bronze strip 11 at regular intervals by injection molding of polyethylene base resin. Thereafter, the phosphor bronze strip 11 is cut at the middle points between the pad bodies 12, and both ends of the phosphor bronze strip of each pad body-phosphor bronze strip assembly thus obtained are bent by substantially 90° to form mounting portions 11a for mounting the pad for the casing. If desired, a lubricant layer may be formed on the surface 12a against which the magnetic recording tape is pressed or the surface 12a may be satinized.

In this embodiment, since the phosphor bronze strip 11 has a width equal to the width of the resilient member from the first, there is no waste of the material, and at the same time, the step of stamping unnecessary parts inherent to the conventional method can be omitted. Further, since the pad body 12 is formed of polyethylene base resin, the surface 12a of the pad body 12 against which the magnetic recording tape is pressed can be easily provided with a lubricant layer or satinized to reduce sliding resistance, thereby uniformizing the force pressing the magnetic recording tape against the magnetic head.

Though in the embodiment described above, the resilient member is formed of phosphor bronze and the pad body is formed of polyethylene base resin, these members may be formed other materials.

Figure 6:
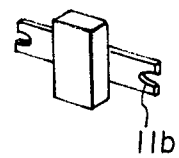

Further, though the pad is mounted on the casing by way of bent ends (11a) in the embodiment described above, the pad may be mounted on the casing by way of cutaway portions formed on opposite ends of a straight resilient member. In such a case, a phosphor bronze strip having openings 11c is used as shown in FIG. 5 and the strip is cut across the openings 11c to form cutaway portions 11b on opposite ends of the resilient member as shown in FIG. 6.

I claim:

1. A method of manufacturing a pad which is for pressing a magnetic recording tape of a magnetic recording tape cassette against a magnetic head and comprises a pad body fixedly mounted on a strip-like resilient member provided with a mounting means for mounting the pad on the casing of the magnetic recording tape cassette, the method comprising steps of feeding a metal strip to a plastic injection mold, molding a plurality of pad bodies on the metal strip by injection molding of synthetic resin, cutting the metal strip at the middle points between the pad bodies, and forming mounting means on each pad body-metal strip assembly thus obtained.

2. A method as defined in claim 1 in which said metal strip is of phosphor bronze.

3. A method as defined in claim 1 or 2 in which said synthetic resin is polyethylene base resin.

4. A method as defined in claim 1 in which said mounting means is formed by bending opposite ends of the metal strip of each pad body-metal strip assembly.

5. A method as defined in claim 1 in which said mounting means is formed by forming cutaway portions on opposite ends of the metal strip of each pad body-metal strip assembly.

* * * * *